Patented Oct. 29, 1929

1,733,574

UNITED STATES PATENT OFFICE

DAVID JULIAN BLOCK, OF CHICAGO, ILLINOIS, ASSIGNOR TO WILLIAM D. STEIN

STARCH CONVERSION PRODUCT

No Drawing. Application filed January 21, 1927. Serial No. 162,676.

This invention relates to a starch conversion product, comprising a plurality of dextrinized or undextrinized starch-esters, which is useful for many purposes in the art, and particularly as an addition agent for flour, enabling bakers to produce bread, cakes and other farinaceous products of superior quality in a more economical manner.

I have found that if starches, or starch containing materials, be subjected to the action of an acid, or acids, and thereafter heated, a number of products ranging from unaltered starch through the dextrinized starch-esters and intermediate products of amylolysis to starch sugars, are obtained. These products, when added to various cereal flours, produce breads, cakes, macaroni, and other baker's products possessing unique and novel properties.

In the form which I at present prefer, the product is a dry or substantially dry, compound containing approximately 10 percent of unaltered starch, 62 percent of the intermediate products of amylolysis which may include the dextrinized or undextrinized mono-, di-, tri-, penta-, tetra- and hexyl acid esters of starch, having the general formula $$C_{12}H_{14}O_{10}(X);$$
$$C_{12}H_{14}O_{10}(X)_2;$$
$$C_{12}H_{14}O_{10}(X)_3;$$
$$C_{12}H_{14}O_{10}(X)_4;$$
$$C_{12}H_{14}O_{10}(X)_5;$$
$$C_{12}H_{14}O_{10}(X)_6;$$

respectively, (in which X indicates an acid radical), together with such substances as tetra-amylose and hexa-amylose; 20 percent of starch sugars such as maltose, dextrose, isomaltose, fructose and raffinose, together with approximately .4 percent of acid with smaller amounts of catalytic and other material.

This dry, white product may be mixed with cereal flours, starch pastes and doughs of various kinds such as bread, cake, macaroni, and the like, in varying proportions and when so used is productive of bakery products and the like, having in the case of bread and pastry a more finely and closely textured crumb, better flavor, better bloom and better keeping qualities than bread and pastry products prepared by ordinary methods, and having approximately one-third greater volume than when no starch conversion product is used.

In the case of macaroni, spaghetti and the like, the form of breaking, known as "checking," is inhibited and the loss to the macaroni manufacturer resulting from the checking and the breaking of these products is materially reduced. It is feasible to employ as much as thirty parts of my improved product to seventy parts of other flour used.

The dextrinized starch esters employed by me are of several types, known respectively as the mono-, di-, tri-, tetra-, penta-, and hexyl acid esters of starch; and the sugars referred to above, which are contained in my novel product, are of the several types known respectively as monosaccharides, disaccharides, trisaccharides and the like. As an example of the monosaccharides, I may cite dextrose; as an example of the disaccharides, I may cite maltose; and as an example of the trisaccharides, I may cite raffinose; all of which may be present in my improved product.

It is now generally understood that before a polysaccharide sugar can be fermented by the yeast enzymes, it must be first broken down to a simple or monosaccharide sugar. This action is facilitated by the presence of the dextrinized starch esters, which apparently serve as a contact material between the yeast enzymes and the monosaccharide sugars. Furthermore, I have found that the presence of dextrinized starch esters facilitates the rapid conversion of the polysaccharide sugars into the simpler forms, so that the process of fermentation, with its accompanying evolution of carbon dioxide gas, is brought about more expeditiously and at a more uniform rate than when no use is made of my improved product.

In addition to the foregoing, the dextrinized starch esters exert a conditioning or modifying effect on the flour proteids, resulting in increased elasticity and consequent expansibility of the gluten, so that under the action of the leavening gases a thinner and more attenuated cell wall is obtained, thereby producing a white, soft and silky crumb, unattainable by any other means within my knowledge. For the same reason, a more homogeneous crumb results, so that in cutting the bread there is materially less tendency for the loaf to crumble away, or for the crumb to detach itself from the crust, as is frequently the case under the present methods of baking.

Because of the greater extensibility of the cell walls, above mentioned, a larger and better formed loaf is also produced. I have found, as the result of many tests, that the moisture loss from such loaves is far less than is the case when no use its made of my novel product: hence, the bread becomes dry or stale less rapidly than under heretofore known methods of baking.

For the sake of a concrete example illustrating one way in which my product may be manufactured in desirable form, details of a specific procedure within the scope of the broad invention will now be set forth. It is to be understood, however, that the invention is not limited to the precise details described but may be varied within the scope of the appended claims in which the invention is more particularly pointed out.

Powdered starch, having no excessive moisture content, (say not in excess of 12%) is first acidulated, by treating the starch with ten to fifteen percent of its weight of glacial acetic acid together with $\frac{1}{10}$ percent of a suitable catalyst, preferably ammonium persulphate or methylamine sulphate. The acid mixture is sprayed upon the starch with a suitable atomizer and the mixture is then ready to be placed in a steam-jacketed converter. Instead of employing glacial acetic acid, the acid may be produced within the starch mass as a vapor by treating the starch prior to the heating operation with an inorganic salt such as calcium acetate, which upon the application of heat, evolves acetic acid vapors.

After the acid has been thoroughly mixed with the starch, the mixture is passed into a steam-jacketed converter provided with means for agitation and the product is heated until a cold-water solubility of approximately 40 to 90 percent is attained. This point is reached when the acidulated starch has been heated to a temperature of approximately 175° C. for about one and one-half hours. When the foregoing water solubility has been attained, my product will have a dextrinized starch ester content of from 2 to 15 percent, and a starch sugar content of approximately 18 to 20 percent. During the heating operation, or at its conclusion, the converter may be connected with a condenser and a portion of the free acid distilled off for reuse.

During the process of conversion frequent tests are made and when the product has attained the characteristics enumerated above, which, it will be understood, may be varied through a rather wide range in order to manufacture an article particularly adapted for use with any of the various flours and doughs, the product is discharged from the converter and rapidly cooled. It is then passed through a system of bolting reels where certain agglomerations designated as "grits" are removed. The product is then packed into bags or other containers and permitted to ripen or age for a period of approximately two weeks at atmospheric temperature.

The above characteristics serve to identify one form of my novel product which is especially desirable for certain purposes. However, there will be present in addition to the dextrinized starch esters certain of the acid esters of starch which have escaped dextrinization and these also are useful in producing the results heretofore enumerated. The product obtained when the foregoing procedure has been properly carried out, will have the following composition, the analysis being typical of one form of my novel flour improver:

|  | Per cent |
|---|---|
| Moisture | 5.60 |
| Unaltered starch | 10.40 |
| Intermediate products of amylolysis (such as tetra-amylose, hexa-amylose, tri-amylose, starch esters and dextrinized products such as mono-, di-, tri-, penta-, tetra-, hexyl-acetyl esters of starch) | 62.10 |
| Starch sugars (such as maltose, dextrose, raffinose and other mono and polysacchorides) | 20.20 |
| Proteins (N 6.25) | 1.20 |
| Total acidity (as lactic acid) | .38 |
| Fat | .37 |
| Ash | .27 |
| Fibre | .48 |

My improved product, in its preferable form, is a substantially dry, and substantially white product having a characteristic sweet-sour taste, an acid reaction, a water solubility of from 40 to 90 percent, and containing a substantial amount of unaltered starch.

In employing this product for bread making, probably the best results are obtained when the flour mixture contains from 1 to 20 percent of my said product, dry weight. The customary amount of yeast, yeast accelerator, fat, salt, water and other usual ingredients, may be used in the ordinary manner. The resultant bread, if properly proportioned as herein directed, presents an unusually white appearance and has additional valuable characteristics as hereinbefore explained.

I shall now describe my baking method in connection with a white bread made from wheat flour, although it will be understood that my invention is applicable to other forms of bread and to cake, pies, macaroni, pastry products and the like.

In practising my baking method, I may take about 70 percent of wheat flour and as much as 30 percent of the starch degradation product described above and the customary amounts of yeast, yeast accelerator, fat, salt, water and other ingredients, including sugar, although the use of sugar is preferably avoided or the amount thereof used greatly decreased. As an example of a formula which I find to be useful in the practice of my process, I give the following approximate proportions: 100 parts flour, 57 parts water, 1½ parts yeast, 1 part shortening, 1¾ parts salt, 3 parts starch degradation product described above, ½ part malt extract.

If a straight dough method of baking is used, the dough made as above described is fermented, punched, proofed, panned and baked in the usual manner, but for a shorter time than heretofore employed. If a sponge method is used, the quantity of starch degradation product used may be divided into two parts, one-half of which enters into the sponge and the other half into the dough.

An important feature of my baking method results from the inclusion, in the starch degradation product added to the dough as above stated, of a combination of dextrinized starch esters and mono and polysaccharides, in lieu of the sugar heretofore used.

In the case of macaroni, in which no leavening operation takes place, I am enabled to practice my improved method in so far as the conditioning of the gluten by means of the acid esters is concerned, so as to limit the "checking" so troublesome to the average macaroni maker and make possible the use of hard flour alone, thus giving a firmer consistency to marcaroni products than is at present attainable.

I am aware that many changes may be made, and numerous details of the process may be varied through a wide range without departing from the principles of this invention, and I therefore do not purpose limiting the patent granted hereon, otherwise than necessitated by the prior art.

I claim as my invention:

1. As a new article of manufacture, a starch conversion product adapted for use in improving dough, containing a starch acid ester.

2. As a new article of manufacture, a starch conversion product adapted for use in improving dough, containing a dextrinized starch acid ester.

3. As a new article of manufacture, a starch conversion product adapted for use in improving dough, comprising a mixture of dextrinized acid esters of starch, mono- and polysaccharide starch sugars, amylose and polymers of amylose.

4. As a new article of manufacture, a starch conversion product adapted for use in improving dough, comprising a plurality of dextrinized starch acid-esters adapted to act as a contact material between yeast and dough to hasten enzymic action.

5. The process of preparing starch conversion products suitable for use in making bread and other farinaceous products, which comprises intimately mixing starch with from 10 to 15 percent of glacial acetic acid together with $\frac{1}{10}$ percent of a suitable catalyst and heating the mixture to 175° C. for one to two hours.

6. The process of preparing starch conversion products suitable for use in making bread and other farinaceous products, which comprises intimately mixing starch with from 10 to 15 percent of glacial acetic acid together with $\frac{1}{10}$ percent of ammonium persulphate and heating the mixture to 175° C. for one to two hours.

7. The process of preparing starch conversion products suitable for use in making bread and other farinaceous products, which comprises intimately mixing starch with from 10 to 15 percent of glacial acetic acid together with $\frac{1}{10}$ percent of ammonium persulphate and heating the mixture to 175° C. for one to two hours, and allowing the mixture to age for a considerable length of time.

8. A starch conversion product for use in the baking and allied industries, comprising a substantially dry composition containing an acetic acid ester of starch and a substantial quantity of unaltered starch.

9. The process of preparing starch conversion products suitable for use in making bread and other farinaceous products, which comprises intimately mixing starch with a substantial quantity of acetic acid in the absence of appreciable quantities of water and heating the mixture in the presence of a suitable catalyst to an elevated temperature.

In testimony whereof I have hereunto subscribed my name.

DAVID JULIAN BLOCK.